United States Patent [19]
Wassenhoven et al.

[11] Patent Number: 5,850,730
[45] Date of Patent: Dec. 22, 1998

[54] OPENING DEVICE FOR AN OPEN-END SPINNING UNIT

[75] Inventors: Heinz-George Wassenhoven; Norbert Schippers; Maximilian Preutenborbeck, all of Mönchengladbach, Germany

[73] Assignee: W. Schlafhorst AG & Co., Moenchengladbach, Germany

[21] Appl. No.: 985,161

[22] Filed: Dec. 4, 1997

[30] Foreign Application Priority Data

Dec. 6, 1996 [DE] Germany ............... 196 50 597.6

[51] Int. Cl.⁶ .................................................. D01H 4/00
[52] U.S. Cl. ........................... 57/408; 57/100; 57/406; 57/411
[58] Field of Search .................. 57/100, 406, 408, 57/411

[56] References Cited

U.S. PATENT DOCUMENTS

| 3,685,272 | 8/1972 | Greenwood et al. ........... 57/406 |
| 4,249,369 | 2/1981 | Tsuzuki et al. ................. 57/100 |
| 5,419,111 | 5/1995 | Wassenhoven et al. ......... 57/407 |
| 5,540,043 | 7/1996 | Raasch . | |

FOREIGN PATENT DOCUMENTS

| 76 07 709.3 | 3/1976 | Germany . |
| 27 21 385 C2 | 5/1977 | Germany . |
| 40 36 017 A1 | 11/1990 | Germany . |
| 43 09 947 A1 | 3/1993 | Germany . |
| 93 04 664.2 | 3/1993 | Germany . |

*Primary Examiner*—William Stryjewski
*Attorney, Agent, or Firm*—Kennedy Covington Lobdell & Hickman, LLP

[57] ABSTRACT

In the course of the installation or removal of an opening roller, the opening fittings, which for example consist of many pointed needles or a sawblade-shaped metal strip, represent a considerable risk of injury. So far no devices are known in connection with opening rollers driven by individual motors which, make unintended starting of the rollers impossible while being replaced and serviced. In accordance with the invention, an opening device has a locking and unlocking device which assures an orderly operation of the opening roller driven by an individual motor and also assures that while servicing or installing the opening roller no danger of injuries can occur, for example because of an unintended starting of the opening roller.

10 Claims, 4 Drawing Sheets

OPENING DEVICE FOR AN OPEN-END SPINNING UNIT

FIELD OF THE INVENTION

The present invention relates to an opening device for an open-end spinning unit of a cheese-producing textile machine wherein an opening roller is driven by an electric motor to rotate in a housing.

BACKGROUND OF THE INVENTION

An open-end spinning machine is known from German Patent 27 21 386, wherein the spinning units and the sliver-opening units are actuated by means of central drive elements extending over the length of the machine. In such machines, the spinning rotor and the opening rollers are respectively driven by a tangential belt, while the drive of the drawing-in rollers is performed by means of a continuous machine shaft. If the opening roller of these machines is to be removed or serviced, it is lifted off the tangential belt and in the process is automatically slowed. An unintentional starting of the components is not possible in this position.

An open-end spinning unit is furthermore described in German Utility Model Gm 93 04 664.2, wherein both the opening roller and the drawing-in roller have respective individual electric drive motors. For example, the individual drive of the opening roller in this machine is embodied as an external rotor motor, wherein the unlocking equipment of the opening roller is arranged on the external rotor.

Opening equipment of this type consists, for example, of a multitude of pointed needles or a saw blade-shaped metal strip extending in the form of a spiral on the circumferential surface of the opening roller.

The opening equipment is a wear item and, in addition to wear, can become unusable by the deposition of dirt and fibers. It is therefore periodically necessary to replace worn opening rollers and to clean dirty opening rollers for maintaining the functional ability of the open-end spinning units, i.e., to assure the greatest possible efficiency of these units.

The opening fittings represent a considerable risk of injury during the removal and installation of such opening rollers. It must therefore be assured that an unintended start-up of this component is made impossible during exchange and cleaning of the opening roller.

OBJECT AND SUMMARY OF THE INVENTION

It is therefore an object of the instant invention to provide an opening device for open-end spinning units of the type having opening rollers driven by individual motors which allows the safe and easy handling of such opening rollers during installation and removal as well as their servicing.

This object is attained in accordance with the present invention by means of an opening device for an open-end spinning unit of a cheese-producing textile machine which basically comprises a housing, an opening roller rotatable within the housing, an electric motor for driving the opening roller, a spring-biased brake for the opening roller, a switch for opening and closing electrical current flow to the motor, and a locking and unlocking device selectively actuable for fixing the opening roller axially in place in the housing, for positively controlling the brake, and for actuating the switch.

Thus, the locking and unlocking device in accordance with the invention secures the opening roller driven by an individual motor in the opening housing until the unlocking device is actuated for unlocking the housing. Specifically, the locking and unlocking device must be switched from an operating position through a roller braking position into one of two unlocked positions for removal of the opening roller. A switch, which interrupts the current supply of the individual drive of the opening roller, is immediately operated when the locking and unlocking device is moved out of the normal operating position. Independently of whether or not the respective open-end spinning unit had already been correctly switched off, it is thereby assured in any case that an unintended activation of the individual drive of the opening roller, in particular by third parties, is no longer possible. Further safety functions are also assigned to the locking and unlocking devices. In the course of actuating the locking and unlocking device, the brake of the opening roller is also simultaneously activated. While the brake is being actuated, the removal of the opening roller is not yet possible, because the locking and unlocking device still prevents the opening roller from being pulled out for servicing or for the removal of the entire opening roller.

By means of the recited safety measures, the invention allows the safe handling of the opening rollers during removal and installation as well as during servicing, for example during cleaning, since only stopped opening rollers are accessible.

As indicated, the locking and unlocking device has further operating positions besides the running position, for example a braking position as well as two unlocked positions.

While in the braking position, the electrical circuit to the individual drive of the opening roller is interrupted and the brake for the opening roller is engaged to stop the roller in the housing of the opening device. The brake is released in the first unlocked position, wherein the opening roller or the motor housing of the individual drive is released to permit removal from the housing only in this position.

The second unlocked position of the locking and unlocking device allows stopping of the opening roller in a second position in which the opening roller can be pulled out of the housing sufficiently far that its fittings are accessible for servicing, such as cleaning.

Depending on the design of the opening device, the opening roller can be removed out of its housing in the opening device by itself or together with the motor housing of its individual drive as a unit. The drive motor has a motor housing with a tubular extension portion, which is seated in a correspondingly tubular extension of the housing in one embodiment of the invention, which makes possible a simple installation and removal exclusively by pulling the entire drive out of or pushing it back into the housing. Seating is stable and the individual drive can be prevented in a simple manner from being removed while the spinning station is running.

The tubular extension portion of the motor housing of the individual drive advantageously offers the possibility for a shaft to be extended therethrough, on one end of which the opening roller is fastened and whose other end section projects out of the tubular extension portion of the motor housing and out of the housing of the opening device, so that wharve embodied as a brake disk may be affixed to the exposed extending portion of the shaft to be acted upon by the brake.

In a preferred embodiment, a cover on the front of the opening roller housing provides the advantage of preventing contact with the rotating opening roller during spinning operation and sealing the housing and the opening roller against possibly damaging admittance of secondary air into the housing and, at the same time, the cover is releasable at any time by movement of the locking and unlocking device into one of the unlocked positions for the removal or installation or the servicing of the opening roller. In this case the cover is spring-loaded to be automatically biased into its open unlocked position. Thus, the opening roller becomes accessible without having to manipulate the cover and the cover does not need a location to be placed during such operations and cannot be misplaced or lost.

The invention is explained in more detail by means of an exemplary embodiment described hereinafter with reference to the accompanying drawings.

DETAILED DESCRIPTION OF THE PREFERRED EMBODIMENT

Figure 1:
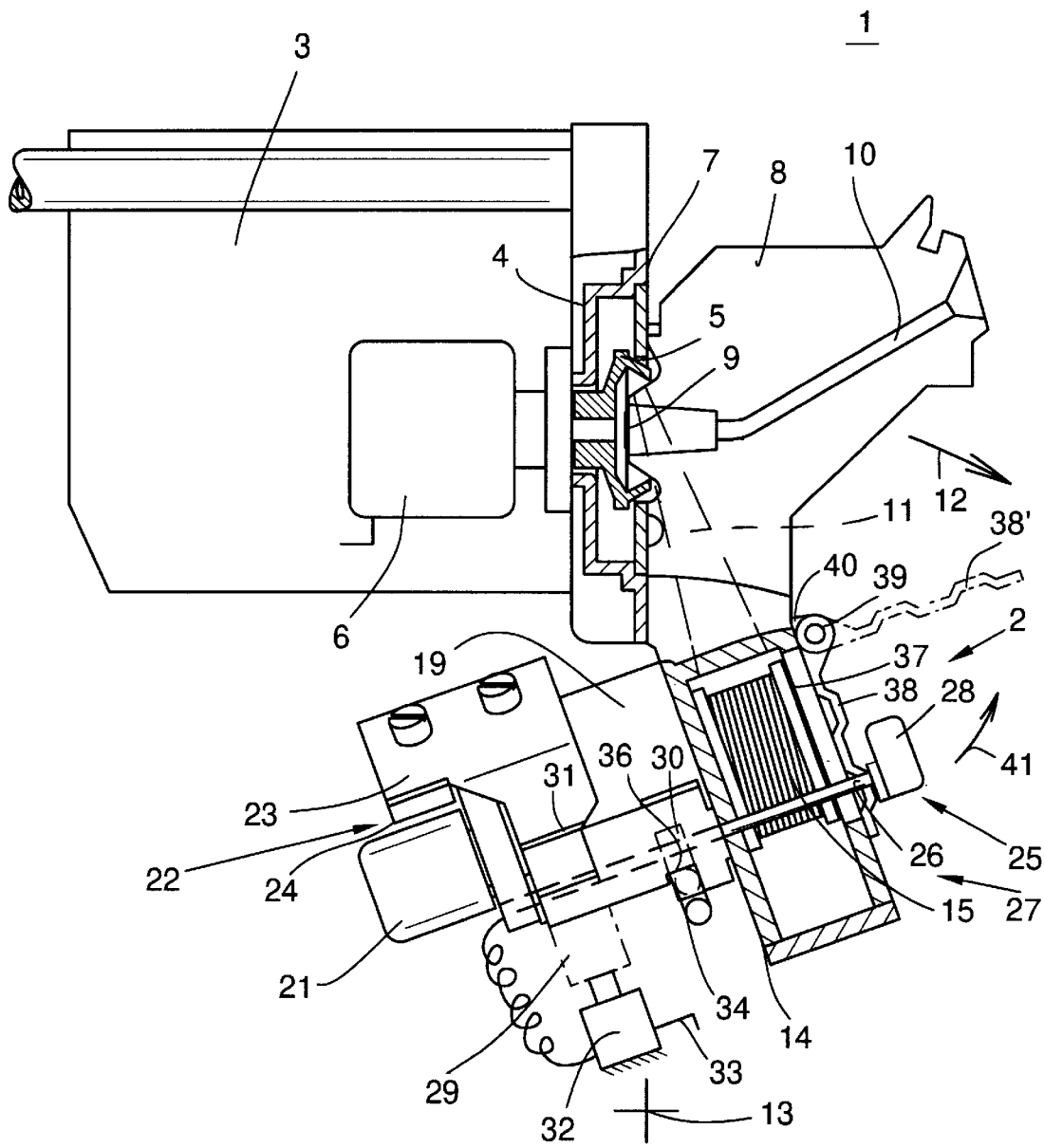
FIG. 1 is a side elevational view, partially in section, of an open-end spinning unit with an opening device having an associated locking and unlocking device according to the present invention.

An open-end spinning unit 1 with its associated opening device 2 of a rotor spinning machine, not otherwise shown in detail, is represented in FIG. 1. Only the features required for comprehending the invention are represented and described.

The open-end spinning unit 1 has a housing 3 fastened on a frame (not represented) of the rotor spinning machine. A rotor enclosure 4, in which a rotor 5 rotates as a yarn spinning means, is formed within the housing 3. In the instant exemplary embodiment, the rotor 5 is driven by means of an individual drive 6, not otherwise shown or described in detail herein. The front wall 7 of the rotor enclosure 4 is closed by a cover 8. An opening device 2 is mounted adjacent and below the housing 3 for receiving and opening a sliver into individual fibers which are then conveyed to the rotor 5 through a fiber guide channel 11, and after spinning of the fibers into a yarn within the rotor 5, the yarn is withdrawn through a draw-off nozzle 9 and a yarn draw-off tube 10. The withdrawal nozzle 9, the yarn withdrawal tube 10 and the fiber guide channel 11 are formed in the cover 8. The cover 8 is pivotable in the direction of the arrow 12 around a hinge point 13 for exposing the rotor 5 and the draw-off nozzle 9 for access thereto.

The opening device 2 disposed below the rotor housing 4 comprises an opening housing 14 in which an opening roller 15 with a respective individual drive 16 (FIG. 2) are mounted. The drive 16 includes a motor housing 17 having a tubular extension portion 18, which is contained within a correspondingly tubular extension 19 of the housing 14 of the opening device 2. A shaft 20 extends through the extension portion 18 of the motor housing 17, one end of the shaft supporting the opening roller 15 and the other end projecting out of the tubular extension portion 18 with a wharve in the form of a brake disk 21 fixed thereon. A brake 22 is fastened on the housing 14 of the opening device 2 adjacent the brake disk 21 and basically consists of a resilient sheet metal element 23, which supports a brake pad 24 for movement into and out of selective braking contact with the brake disk 21.

The brake 22 is adapted for stopping engagement with the brake disk 21 prior to the removal, cleaning or other servicing of the opening roller 15. Actuation of the brake 22 takes place by means of a locking and unlocking device 25 which has a shaft 26 rotatably seated in the housing 14 of the opening device 2 with an actuating lever 28 affixed to a forward end of the shaft 26 projecting from the front side 27 of the housing 14 for turning the shaft 26 and two profiled disks 29 and 30 fixed at rearward spacings to the shaft 26.

The profiled disk 29 is adapted to actuate the brake 22 by engagement with a tongue 31 of the resilient sheet metal element 23, and also to actuate a switch 32 located in the current supply line 33 for the individual drive 16. The profiled disk 30 is arranged to engage and thereby actuate an arresting device 34, by means of which the opening roller 15 is held fixed in place in the housing 14 of the opening device 2. In the instant exemplary embodiment, the arresting device 34 is a spring wire disposed for movement into and out of an annular groove 35 which extends concentrically around the tube-shaped extension portion 18 of the motor housing 17 of the individual drive 16. So that the arresting device 34 can enter into the groove 35, a slot-like window 36 is formed in the tube-shaped extension 19 of the housing 14 of the opening device 2.

In the instant exemplary embodiment, the forward side 37 of the opening roller 15 at the front 27 of the housing 14 of the opening device 2 is enclosed by a cover 38, which additionally seals this area of the opening roller 15 against secondary air which might disturb the transport of the fibers loosened from the sliver into the rotor 5. The cover 38 is pivotably supported by a hinge 39 above the opening roller 15 on the housing 14 of the opening device 2. In the closed position, the cover 38 places a biasing spring 40 associated with the hinge 39 under tension. If the locking and unlocking device 25 is pivoted (as hereinafter described) into a position in which the removal of the opening roller 15 out of its housing 14 is possible, or in which the opening roller 15 is in a cleaning position, the cover 38 is released by means of the actuating lever 28 to be pivoted by the action of the spring 40 into the position 38' shown in broken lines in FIG. 1 thereby making the opening roller 15 accessible.

Figure 2:
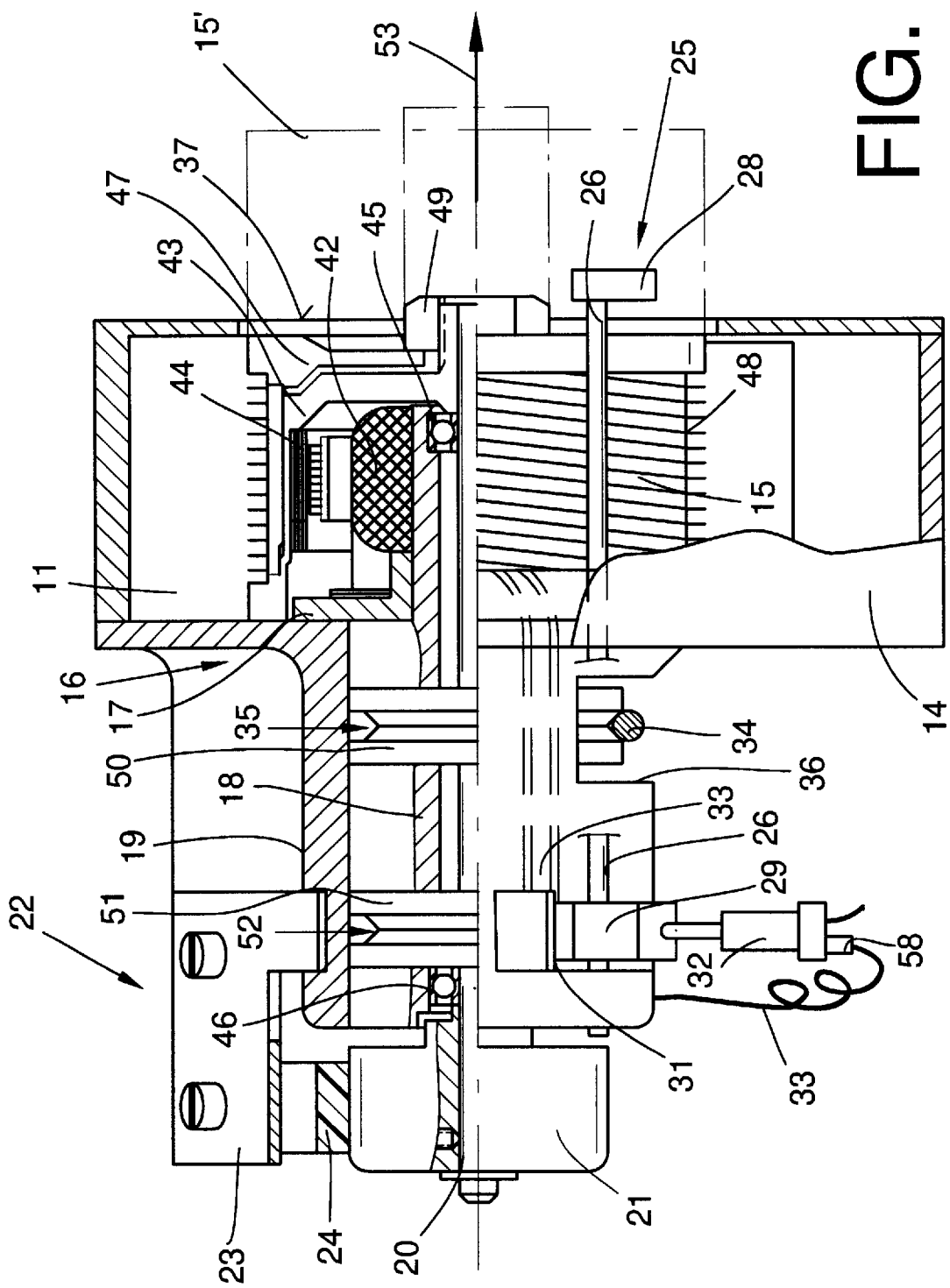
FIG. 2 is an enlarged side elevational view, also partially in section, of the opening device and associated locking and unlocking device of FIG. 1, showing the opening roller seated in the housing and individually driven by a motor.

The opening roller 15, as driven by its respective individual motor, is represented in more detail in FIG. 2. As already indicated, the motor housing 17 of the individual drive 16 has a tubular extension portion 18 which is directly or indirectly seated in a tubular extension 19 of the housing 14 of the opening device 2. In the illustrated embodiment, the individual drive 16 is an external rotor motor, which can be seen in the sectioned portion of FIG. 2. The opening roller 15 is cup-shaped to enclose the stator windings 42 of the drive motor 16.

The opening roller 15 is comprised of a cup-shaped base body 43 supporting permanent magnets 44 on its interior circumference. This base body 43 is fixedly connected with the shaft 20, which is supported inside the tubular extension portion 18 of the motor housing 17 by bearings 45 and 46. A further cup-shaped body 47 is fitted over the base body 43 and supports the fittings 48 for opening the sliver. This so-called fittings ring 47 is replaceably bolted to the base body 43, as indicated by a nut 49.

In the instant exemplary embodiment, the complete opening roller 15, i.e., inclusive of its individual drive 16, can be replaced. In order to be able to arrest the individual drive 16 in the housing 14 of the opening device 2, the tube-shaped extension 19 of the housing 14 of the opening device 2 is formed with the slot-like window 36. In the area of this window, the spring wire arresting device 34 can be inserted into the groove 35 in the tube-shaped extension 18 of the motor housing 17 of the individual drive 16. In the instant exemplary embodiment, this groove 35 is formed by a grooved ring 50 placed on the tube-shaped extension 18.

It is required, particularly in connection with cleaning operations, for the opening roller 15 to be partially pulled out of the housing 14 of the opening device 2. To this end, first the arresting device 34 is lifted out of the groove 35 by the profiled disk 30 disposed on the shaft 26 of the locking and unlocking device 25. Thereafter, it is possible to pull the opening roller 15, complete with its individual drive 16, in the direction of theaarrow 53 sufficiently far out of the tube-shaped extension 19 of the housing 14 of the opening device 2, until the opening roller 15 is in the position 15' shown in broken lines. In this position the opening roller 15 is secured against further displacement or falling out of the housing 14 of the opening device 2 by means engagement by the arresting device 34 with a groove 52 of a second grooved ring 51. The two grooved rings 50 and 51 are spaced sufficiently apart that in the position 15' of the opening roller the arresting device 34 can extend into the groove 52 of the grooved ring 51.

Thus, pulling the opening roller 15 out is only possible if the locking and unlocking device 25 has not only released the arresting device 34 but has also released the brake 22.

In the representation of FIG. 2, the locking and unlocking device 25 is in the braked position, i.e., the shaft 26 seated in the housing 14 of the opening device 2 and in the tube-shaped extension 19 has been turned by means of the actuating lever 28 such that the profiled disk 29 is in a position in which the brake pad 24 rests on the brake disk 21, and the switch 32 in the current supply line 33 of the individual drive 16 has been released and the current flow thereby has been interrupted. In such case, the resilient sheet metal element 23 assures that the tongue 31 always remains in contact with the profiled disk 29. Depending on which profiled surface of the profiled disk 29 rests against the tongue 31, the brake pad 24 is either lifted off the brake disk 21 or is lowered onto the brake disk 21 by means of the resilient sheet metal piece 23.

The actuation of the brake 22, the switch 32 and the arresting device 34 for the motor housing 17 of the individual drive 16 will be described hereinafter in further detail by means of FIGS. 3 to 6. In the process, the four possible positions of the locking and unlocking device 25 on these components will be explained.

Each one of the profiled disks 29 and 30 respectively has at least two different surfaces, with which in the intended position they are in contact with the element to be actuated. In this embodiment, it can be determined by means of the position of the actuating lever 28 which of the four possible positions the locking and unlocking device 25 has taken up at a given time. In the respective positions, the profiled disks 29, 30 are locked with their profiled surfaces on the elements they are intended to actuate.

Figure 3:
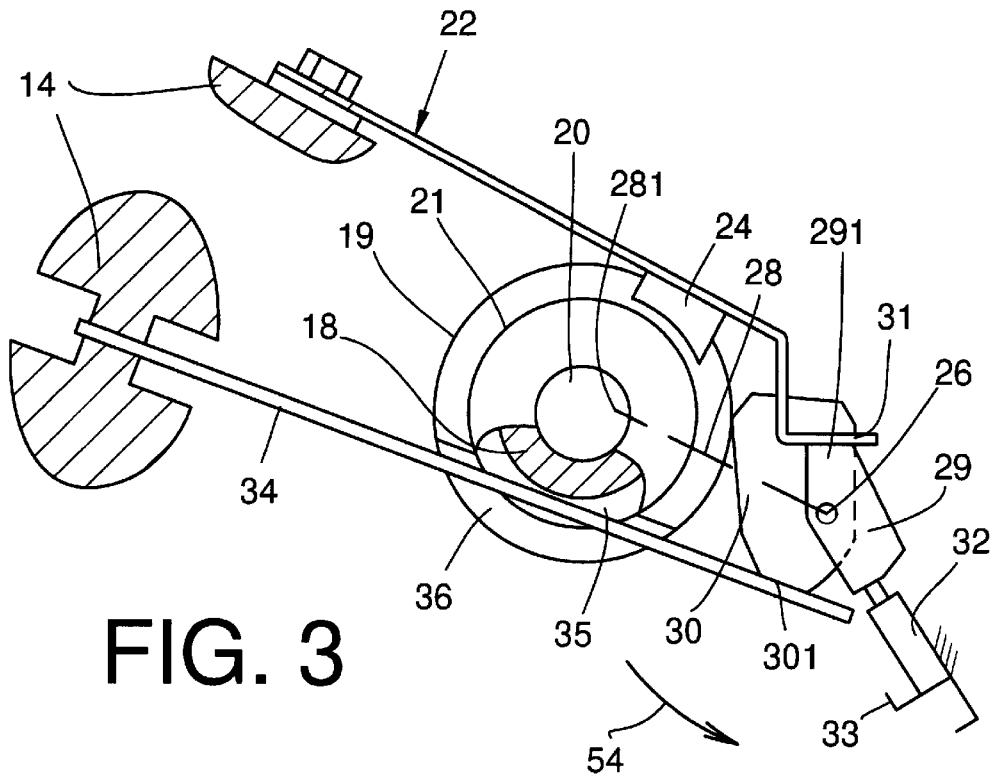
FIGS. 3 to 6 are left end elevational views, partially in section, of the opening device and the associated locking and unlocking device of FIGS. 1 and 2, showing the individual actuating positions of the locking and unlocking device.

FIG. 3 shows the locking and unlocking device 25 in its basic position, in which the actuating lever 28 is in a so-called running position 281 which prevails during normal spinning operations. In the running position 281, the brake pad 24 of the brake 22 is lifted off the brake disk 21 by engagement of the profiled surface 291 of the profiled disk 29 against the tongue 31 of the resilient element 23, so that the opening roller 15 can freely turn. The arresting device 34 rests in the groove 35 and thereby fixes the motor housing 17 of the individual drive 16 in place within the tube-shaped extension 19 of the housing 14 of the opening device 2. Furthermore, the switch 32 in the current supply line 33 to the individual drive 16 is actuated by depression thereof by the profiled disk 29, so that electrical energy flows to the drive motor to drive the opening roller 15. The profiled surface 301 of the profiled disk 30 rests against the arresting device 34 of the individual drive 16, but without lifting the arresting device 34 out of the groove 35.

Figure 4:
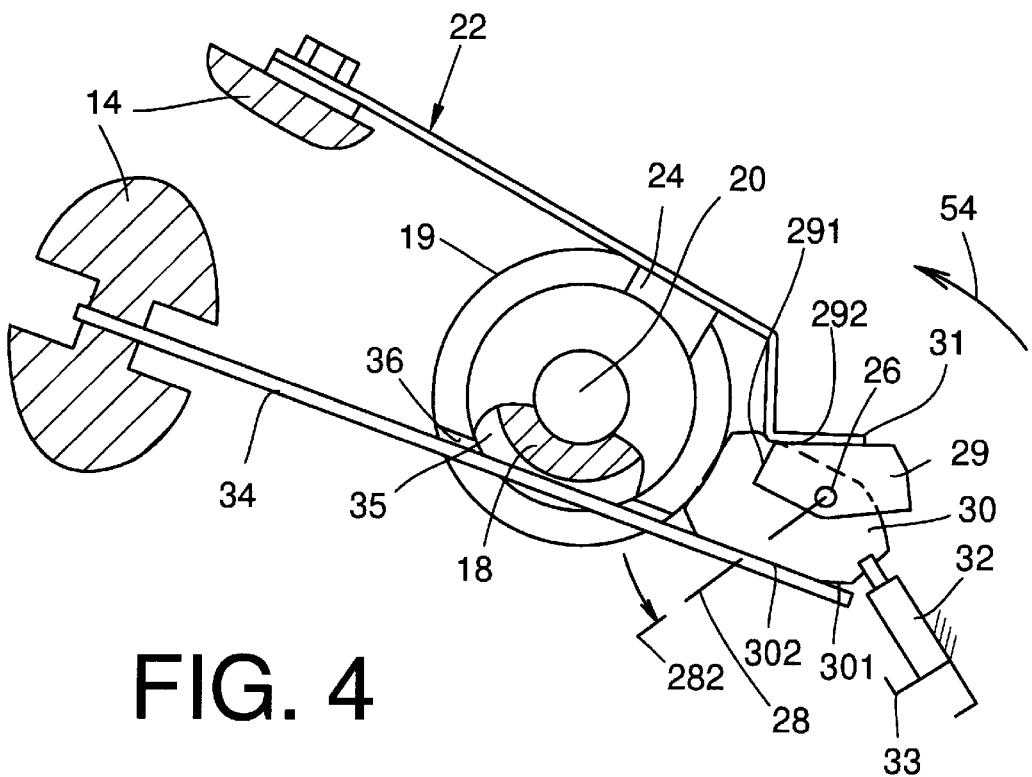

In FIG. 4, the actuating lever 28, and therefore the locking and unlocking device 25, have been pivoted into a braking position 282 wherein the profiled surface 292 of the profiled disk 29 rests against the tongue 31 of the brake. The profiled surface 292 has a lesser radial distance from the shaft 26 which supports the profiled disk than the profiled surface 291, so that tongue 31 of the resilient element 23 and, in turn, the brake pad 24 of the brake 22 are lowered into contact with the brake disk 21, therefore braking the opening roller 15. Furthermore, during the pivotal movement of the locking and unlocking device 25, the pressure switch 32 is released out of engagement with the profiled disk 29, whereby the energy supply to the individual drive 16 via the current supply line 33 is interrupted and, as a result, the opening roller 15 is no longer driven. In this case, while the profiled disk 30 has also moved, no change is effected in the position of the arresting device 34 within the groove 35, since the profiled surface 302 of the profiled disk 30 has the same radial distance from the shaft 26 as the profiled surface 301.

Figure 5:
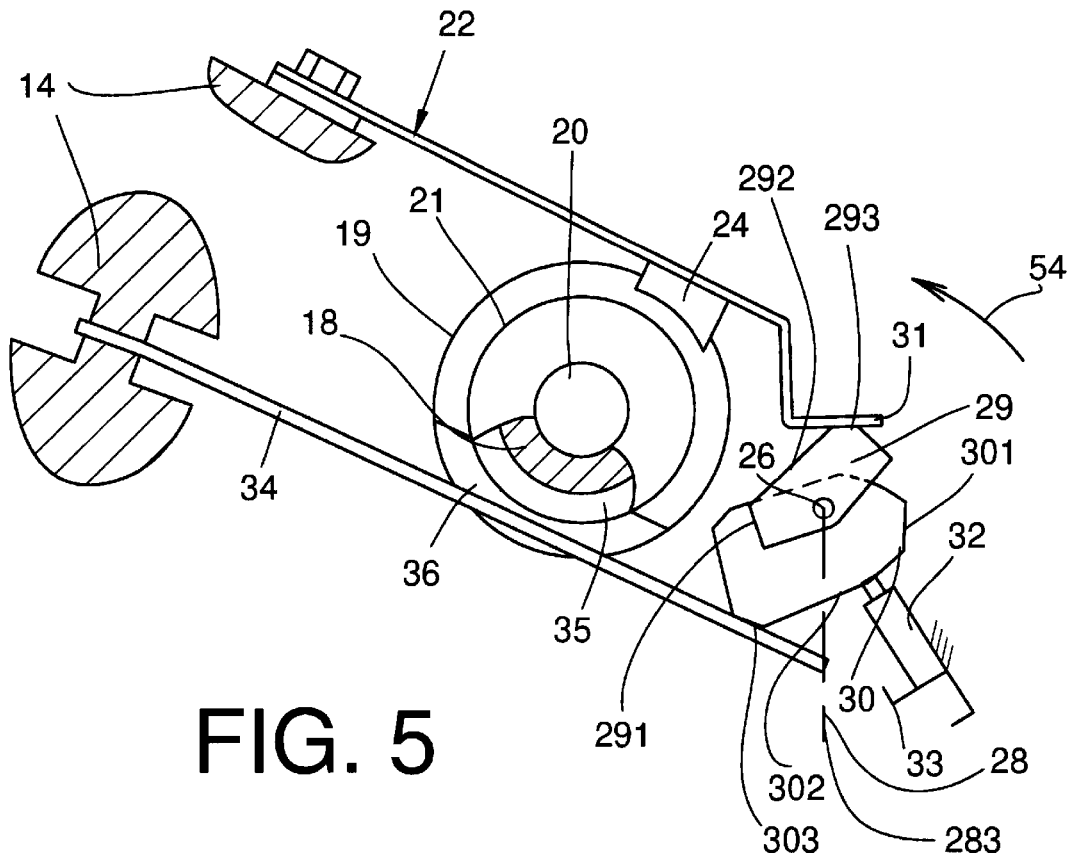

The first of two unlocked positions of the locking and unlocking device 25, a so-called removal position 283, is represented in FIG. 5. In this position, the actuating lever 28 has been pivoted into a position in which the cover 38 at the front side 37 of the opening roller 15 has been completely released. The removal of the complete opening roller 15 together with the individual drive 16 is possible in this position of the locking and unlocking device 25. The switch 32 continues to remain unactuated in this position. The profiled surface 293 of the disk 29 has a sufficiently greater radial distance from the shaft 26 than the profiled surface 292 and therefore engages against the tongue 31 of the brake 22 to lift the brake pad 24 from the brake disk 21. Since the profiled surface 303 of the profiled disk 30 has a greater radial distance from the shaft 26 than the previously acting profiled surfaces 301 and 302, the arresting device 34 is lifted out of the groove 35 in the tube-shaped extension portion 18 of the motor housing 17 of the individual drive 16.

The energy supply must also be disconnected during the removal of the opening roller 15 out of the housing 14 of the opening device 2. It is therefore provided that either the current supply line 33 of the individual drive 16 is also removed, in which case the current supply line is separated, for example by disengaging a plug connection 58 on the switch 33, or a comparable plug connection (not represented here), preferably stationary, may be disposed between the housing 14 and the individual drive 16.

A complete change of the opening fittings, including the individual drive, can take place in this so-called removal position, which is useful, for example, if an opening roller with a different opening profile is required during a batch change. The removal and installation of the opening roller together with its drive is simpler and is faster than if first the portion of the opening roller 47 containing the fittings 48 were to be unscrewed from the base body 43.

Figure 6:
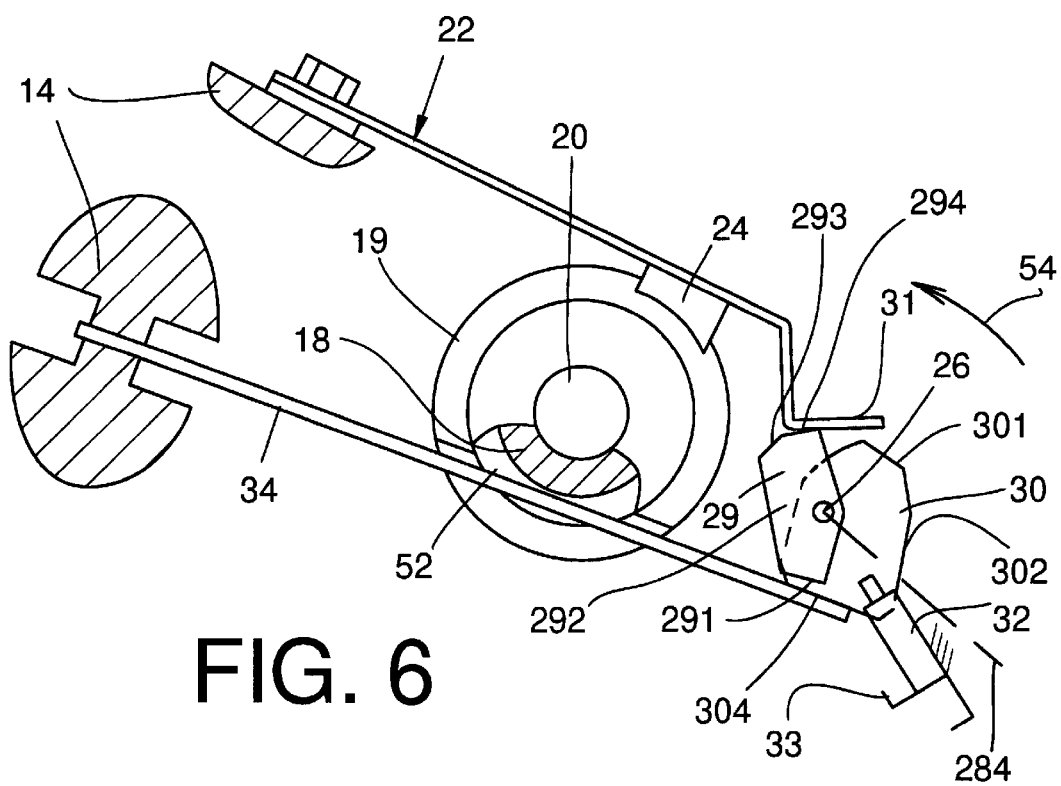

The second unlocked position of the locking and unlocking device 25, a so-called arresting position 284 which is attained when the actuating lever 28 is further pivoted into its extreme outer position, is represented in FIG. 6. In the arresting position 284 the opening roller is fixed in place in a position where it has been pulled out of the housing 14, as represented by the opening roller 15' drawn in dashed lines in FIG. 2. In such position, the fittings 48 can be serviced, for example cleaned. So that the opening roller can be turned, the brake pad 24 is lifted off the brake disk 21 by the profiled surface 294 of the profiled disk 29. In comparison with the profiled surface 303, the profiled surface 304 of the profiled disk 30 is at a lesser radial distance from the shaft 26, so that in the instant position the arresting device 34 secures the individual drive 16, and therefore the opening roller 15, against further axial displacement by being engaged in the groove 52 which has now been moved forwardly with the opening roller unit. In this position of the locking and unlocking device 25 the switch 32 is also not actuated.

If the opening roller is to be pushed back from its cleaning position, indicated by 15' in FIG. 2, into its normal running position, the actuating lever 28 of the locking and unlocking device 25 first must be pivoted back into the removal position represented in FIG. 5. While the locking and unlocking device 25 passes through the positions represented in FIGS. 4 and 3, the opening roller 15 is secured by means of the locking of the arresting device 34 in the groove 52. Only when the actuating lever 28 is switched into the position 281, i.e., the running position, is the switch 32 actuated by the profiled disk 29 of the locking and unlocking device 25, so that the drive of the opening roller 15 can again be switched on via the main switch of the spinning position.

The cover 38, which covers the front 37 of the opening roller 15 as represented in FIG. 1, is released in the braking position 282 as well as in the unlocked positions, for example the removal position 283 or the arresting position 284, and pivoted by means of a spring 40 into the unlocked position 38'.

In connection with the instant exemplary embodiment, the opening roller can be completely removed together with its individual drive. However, it is also conceivable that the individual drive is laid out in such a way that only the opening roller and the shaft on which it is seated can be installed or removed or brought into a position for cleaning in the individual positions of the locking and unlocking device 25. In this case the arresting device 34 would not act on the housing 18 of the individual drive 16, but on the shaft 20 on which the opening roller 15 is seated. For changing the motor, a release of the stator element of the drive would then take place by means of an approximately comparable device.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An opening device for an open-end spinning unit of a cheese-producing textile machine comprising a housing, an opening roller rotatable within the housing, an electric motor for driving the opening roller, a spring-biased brake for the opening roller, a switch for opening and closing electrical current flow to the motor, and a locking and unlocking device selectively actuable for fixing the opening roller axially in place in the housing, for positively controlling the brake, and for actuating the switch.

2. The opening device in accordance with claim 1, wherein the locking and unlocking device is movable between a running position for normal spinning operation of the spinning unit, a braking position wherein the brake is engaged for stopping rotation of the opening roller and two unlocked positions wherein the opening roller is removable axially from the housing.

3. The opening device in accordance with claim 2, wherein, in the braking position of the locking and unlocking device, the switch is opened, the brake is engaged against a brake disk connected with the opening roller and the opening roller is axially fixed in place in the housing.

4. The opening device in accordance with claim 2, wherein, in a first one of the unlocked positions, the switch is open, the brake is released and the opening roller is removable from the housing.

5. The opening device in accordance with claim 2, wherein, in a second unlocked position, the opening roller is partially removable from the housing into a partially removed position accessible for servicing and is axially fixed in place in the partially removed position.

6. The opening device in accordance with claim 1, wherein the housing for the opening roller comprises a tubular extension and the motor comprises a motor housing having a tubular extension portion disposed within the tubular extension of the housing.

7. The opening device in accordance with claim 6, and further comprising a shaft supporting the opening roller and extending through the tubular extension portion of the motor housing.

8. The opening device in accordance with claim 7, wherein one end of the shaft projects from the tubular extension portion of the motor housing and from the tubular extension of the housing and has a brake disk supported thereon for engagement by the brake.

9. The opening device in accordance with claim 1, wherein the housing includes a cover mounted on the housing for the opening roller, the locking and unlocking device comprising an actuating lever for maintaining the cover in a closed position during spinning operation of the open-end unit.

10. The opening device in accordance with claim 9, wherein the housing comprises a spring biasing the cover into an open position to release the cover to open when the locking and unlocking device is in one of the unlocked positions.

* * * * *